(12) United States Patent
Li et al.

(10) Patent No.: US 9,116,399 B2
(45) Date of Patent: Aug. 25, 2015

(54) BLUE-PHASE LIQUID CRYSTAL PANEL AND BLUE-PHASE LIQUID CRYSTAL DISPLAY DEVICE

(71) Applicant: BOE TECHNOLOGY GROUP CO., LTD., Beijing (CN)

(72) Inventors: Hui Li, Beijing (CN); Hyun Sic Choi, Beijing (CN); Yoon Sung Um, Beijing (CN); Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 64 days.

(21) Appl. No.: 13/985,162

(22) PCT Filed: Oct. 30, 2012

(86) PCT No.: PCT/CN2012/083776
§ 371 (c)(1),
(2) Date: Aug. 13, 2013

(87) PCT Pub. No.: WO2014/015569
PCT Pub. Date: Jan. 30, 2014

(65) Prior Publication Data
US 2015/0036075 A1  Feb. 5, 2015

(30) Foreign Application Priority Data

Jul. 27, 2012  (CN) .......................... 2012 1 0265643

(51) Int. Cl.
*G02F 1/1335* (2006.01)
*G02F 1/1343* (2006.01)
*G02B 3/00* (2006.01)
*G02B 5/04* (2006.01)
*G02F 1/137* (2006.01)

(52) U.S. Cl.
CPC ........ *G02F 1/134309* (2013.01); *G02F 1/1336* (2013.01); *G02F 1/133504* (2013.01);
(Continued)

(58) Field of Classification Search
CPC ................ G02F 1/1335; G02F 1/1336; G02F 1/133753; G02F 1/133504; G02F 1/1368; G02F 1/133524; G02F 1/133526; H01L 29/78609; H01L 29/7869; H01L 29/66969; H01L 27/1225; H01L 27/12; G02B 6/0053; G02B 6/0038; G02B 5/0226
USPC .......................................................... 349/62
See application file for complete search history.

(56) References Cited

U.S. PATENT DOCUMENTS

| 7,313,309 B2 * | 12/2007 | Numata et al. ................. 385/130 |
| 2011/0234572 A1 | 9/2011 | Toko |
| 2015/0036080 A1 * | 2/2015 | Yan et al. ........................ 349/96 |

FOREIGN PATENT DOCUMENTS

| CN | 202693961 U | 1/2013 |
| JP | 2010-026200 A | 2/2010 |

OTHER PUBLICATIONS

Hui-Chuan Cheng, et al; "Vertical field switching for blue-phase liquid crystal devices", Applied Physics Letters, vol. 98, pp. 261102-1-261102-3; Published online Jun. 27, 2011.
Hui-Chuan Cheng, et al; "Blue-Phase Liquid Crystal Displays With Veritcal Field Switching", Journal of Display Technology vol. 8, No. 2, Feb. 2012; pp. 98-103.
International Search Report; mailed Sep. 5, 2013; PCT/CN2012/083776.

(Continued)

*Primary Examiner* — Dung Nguyen
*Assistant Examiner* — David Chung
(74) *Attorney, Agent, or Firm* — Ladas & Parry LLP

(57) ABSTRACT

A blue-phase liquid crystal panel is described which includes a first substrate, a second substrate, a blue-phase liquid crystal layer between the first substrate and the second substrate; a first electrode located on one surface of the first substrate, a first substrate coupling film located on another surface of the first substrate; a second electrode located on one surface of the second substrate; the first electrode and the second electrode forming a vertical electric field; the first substrate coupling film converting the direct front light of the backlight module into slant front light having a predetermined angle with the perpendicular electric field direction. By generating a vertical electric field, the liquid crystal panel enhances the electric field strength and uniformity of the blue-phase liquid crystal layer, and by changing the angle of light of the backlight source entering the liquid crystal cell, subjecting the incident light to phase retard, thus lowering the operating voltages of the blue-phase liquid crystal panel.

10 Claims, 2 Drawing Sheets

(52) U.S. Cl.
CPC .... G02F1/133528 (2013.01); G02F 1/133553 (2013.01); G02F 1/133621 (2013.01); *G02B 3/005* (2013.01); *G02B 5/045* (2013.01); *G02F 2001/13793* (2013.01)

(56) References Cited

OTHER PUBLICATIONS

First Chinese Office Action dated May 6, 2014; Appln. No. 201210265643.X.

Third Chinese Office Action Appln. No. 201210265643.X; Dated Nov. 15, 2015.

International Preliminary Report on Patentability dated Jan. 27, 2015; PCT/CN2012/083776.

Chinese Rejection Decision dated Apr. 9, 2015; Appln. No. 201210265643.X.

\* cited by examiner

BLUE-PHASE LIQUID CRYSTAL PANEL AND BLUE-PHASE LIQUID CRYSTAL DISPLAY DEVICE

TECHNICAL FIELD

Embodiments of the present invention relate to a blue-phase liquid crystal panel and a blue-phase liquid crystal display device.

BACKGROUND

A TFT-LCD display with high performance may be obtained with application of a blue-phase liquid crystal to a liquid crystal display device. Compared to the conventional liquid crystal, the blue-phase liquid crystal has the following prominent advantages: the theoretical response time of blue-phase liquid crystal displaying can reach the level less than millisecond (ms), and the response speed may be 10 times quicker than that of common nematic phase liquid crystal, so blue-phase liquid crystal can be applied to a display apparatus requiring a fast response speed, e.g., a colored time sequence display; the blue-phase liquid crystal does not need any alignment layers, which can simplify the manufacturing process and lower production costs. Thus, the blue-phase liquid crystal has attracted wide attention.

But, the blue-phase liquid crystal display device is still limited to that of a transverse electric field type, and can not be applied to vertical electric field, because the current blue-phase liquid crystals employed by the liquid crystal display device are all positive liquid crystals.

FIG. 1 shows a structural schematic view of a blue-phase liquid crystal panel in the conventional technology. The conventional blue-phase liquid crystal panel comprises: an array substrate 1, a plurality of electrodes 2 disposed on the array substrate 1, a color filter substrate 3, and a blue-phase liquid crystal layer 4 disposed between the color filter substrate 3 and the array substrate 1. In the blue-phase liquid crystal panel, the plurality of electrodes 2 are arranged on the array substrate 1, and a horizontal electric field is formed by applying a potential difference between adjacent two electrodes 2. The distribution of the electric field is substantially as shown in FIG. 1. In the space between the array substrate 1 and the color filter substrate 3, the difference in electric field strength at different positions varies greatly along with the distances between the electrodes 2. Therefore, in the blue-phase liquid crystal layer 4 between the array substrate 1 and the color filter substrate 3, a greater electric field force is exerted onto the lower layer blue-phase liquid crystal molecule 42 closer to the array substrate 1, causing greater deflection, while a less electric field force is exerted onto the upper layer blue-phase liquid crystal molecule 41 further away from the array substrate 1, causing smaller deflection. Such non-uniform deflection is unfavorable for displaying. In order to increase uniformity of the electric field between the array substrate 1 and the color filter substrate 3, and to reduce difference, in the orientation and strength of the electric field between the lower layer blue-phase liquid crystal molecule 42 closer to the array substrate 1 and the upper layer blue-phase liquid crystal molecule 41 further away from the array substrate 1, to a minimum degree, higher operating voltages shall be applied to the electrodes 2.

Therefore, the problem of great energy consumption due to high operating voltages generally exists in the blue-phase liquid crystal panel and the blue-phase liquid crystal display device in the conventional technologies.

SUMMARY

Embodiments of the present invention provide a blue-phase liquid crystal panel and a blue-phase liquid crystal display device, in order to lower the operating voltages of the blue-phase liquid crystal panel and blue-phase liquid crystal display device, and thus to reduce energy consumption.

One aspect of the present invention provides a blue-phase liquid crystal panel, which comprises a first substrate; a second substrate; and a blue-phase liquid crystal layer between the first substrate and the second substrate, the first substrate being disposed opposite to the second substrate; a first electrode located on one surface of the first substrate facing the blue-phase liquid crystal layer; a first polarizer and a first substrate coupling film located on another surface of the first substrate, the first polarizer being located between the first substrate and the first substrate coupling film; a second electrode located on one surface of the second substrate facing the blue-phase liquid crystal layer; a second polarizer located on another surface of the second substrate, the first electrode and the second electrode being used for forming a vertical electric field; a plurality of first microprisms are formed on the first substrate coupling film, a cross section of a first microprism having a profile in a triangle shape, the first microprism having a first prismatic face and a second prismatic face, and incident light perpendicular to the first substrate is totally reflected at the first prismatic face and is not totally reflected at the second prismatic face; one of the first electrode and the second electrode is a common electrode, while the other one comprises a plurality of pixel electrodes.

For example, the first prismatic face and the second prismatic face of the first microprism are perpendicular to each other, and an angle between the first prismatic face and the first substrate is 75°~65°.

For example, the angle between the first prismatic face and the first substrate is 70°.

For example, the panel further comprises a second substrate coupling film, the second polarizer being located between the second substrate and the second substrate coupling film, a plurality of second microprisms being disposed on the second substrate coupling film.

For example, the panel further comprises a deflecting film that is located on a side of the second substrate coupling film away from the second polarizer.

For example, the deflecting film is provided with a plurality of diffusion protrusions on a side facing the second substrate coupling film.

For example, each of the diffusion protrusions has a profile in a triangle shape.

For example, each of the diffusion protrusions has a profile in a circular arc shape.

For example, the first substrate coupling film and the second substrate coupling film meet same specifications, and the first microprisms and the second microprisms are reversely disposed.

Another aspect of the present invention provides a blue-phase liquid crystal display device, which comprises a backlight module and a blue-phase liquid crystal panel according to any one of the aforementioned technical solutions.

For example, the backlight module is provided with a white light source, and the second substrate of the blue-phase liquid crystal panel is provided with color filter.

For example, the backlight module is provided with a colored light source.

In the embodiments of the present invention, the first electrode is provided on the first substrate, and the second electrode is provided on the second substrate. After being energized, the first electrode and the second electrode generate an electric field being directed from the electrode at a higher potential to the electrode at a lower potential. The direction of the electric field is perpendicular to the blue-phase liquid crystal layer, thus effectively increasing the electric field strength of the entire liquid crystal cell area. In addition, the perpendicular electric field has a good uniformity, which allows the blue-phase liquid crystal molecules in each pixel region of the blue-phase liquid crystal display device to response and to be stretched in a direction perpendicular to the first substrate and the second substrate. At the same time, the first substrate coupling film changes the light angle of the direct front light of the backlight module entering the liquid crystal cell via the first microprism, and the blue-phase liquid crystal molecule in the blue-phase liquid crystal layer causes phase retard of the incident slant front light, which lowers the operating voltage of the blue-phase liquid crystal.

Therefore, the blue-phase liquid crystal panel provided in the embodiment of the present invention has a lower operating voltage.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, the technical or scientific terms used herein shall have the general meanings understandable for those ordinarily skilled in the field of the present invention. The terms "first", "second" . . . and the like in the description and in the claims, if any, are used for distinguishing between similar elements and not necessarily for describing any order, number or priority. The words such as "a", "an," "the" or similar shall not represent limitation of numbers, but mean existence of at least one. The words "on", "under", "left", "right" and etc. shall be used only to represent relative positions, wherein, when the absolute position of the described object is changed, the relative positions may be changed accordingly.

In the following statement, a concept of "backlight module" is introduced in order to describe the structure and principle of the blue-phase liquid crystal panel. An example of the backlight module 15 is shown in FIG. 6.

Figure 2:
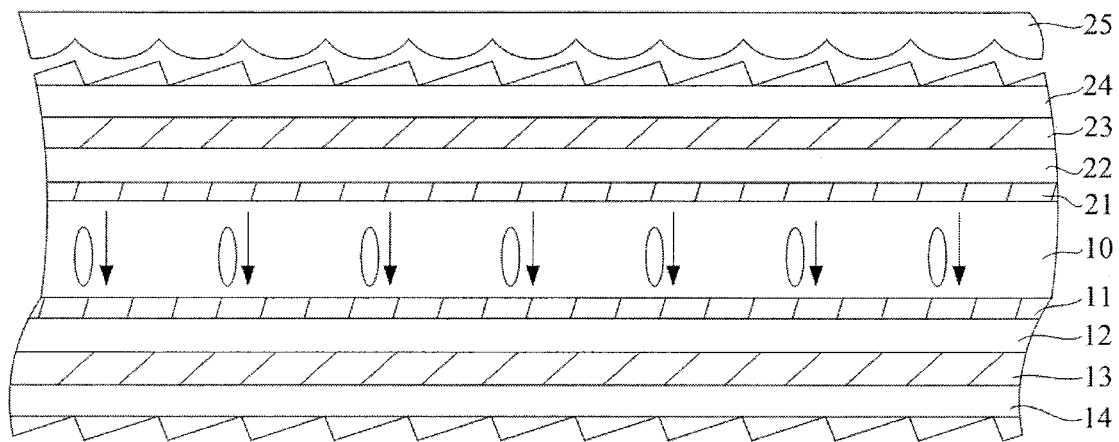
FIG. 2 is a structural schematic view of the blue-phase liquid crystal panel provided in the present invention.
Figure 3:
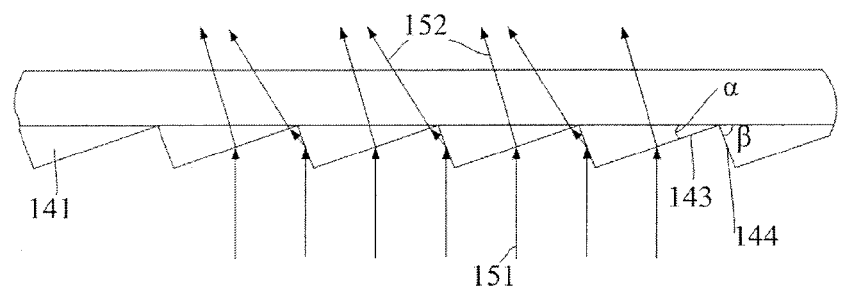
FIG. 3 is a schematic view showing the structure and the coupling principle of the first substrate coupling film in the blue-phase liquid crystal panel provided in the present invention.
Figure 6:
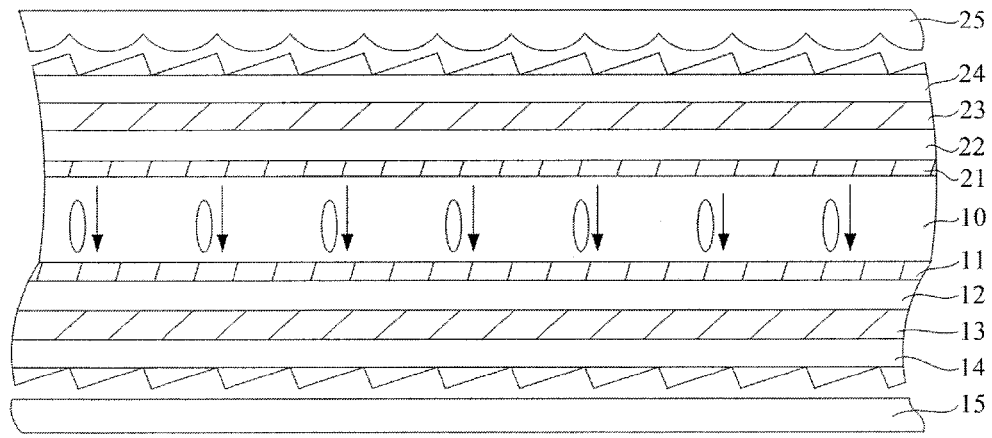
FIG. 6 is structural schematic view of the blue-phase liquid crystal display device provided in the present invention.

As shown in FIG. 2, FIG. 3 and FIG. 6, a blue-phase liquid crystal panel provided in one embodiment of the present invention comprises a first substrate 12, a second substrate 22, and a blue-phase liquid crystal layer 10 between the first substrate 12 and the second substrate 22, the first substrate 11 being disposed opposite to the second substrate 22. The blue-phase liquid crystal in the blue-phase liquid crystal layer 10 is, for example, a polymer stabilized blue-phase liquid crystal (PS-BPLC), a blue-phase liquid crystal of double mesogenic unit type or the like.

The blue-phase liquid crystal panel further comprises a first electrode 11 located on one surface of the first substrate 12 facing the blue-phase liquid crystal layer 10, a first polarizer 13, and a first substrate coupling film 14 located on another surface of the first substrate 12. The first polarizer 13 is located between the first substrate 12 and the first substrate coupling film 14.

The blue-phase liquid crystal panel further comprises a second electrode 21 located on one surface of the second substrate 22 facing the blue-phase liquid crystal layer 10, and comprises a second polarizer 23 located on another surface of the second substrate 22. The first electrode and the second electrode are used for forming a vertical electric field.

A plurality of first microprisms 141 are disposed on a side of the first substrate coupling film 14; the cross section of a first microprism 141 has a profile of a triangle shape, and the first microprism 141 has a first prismatic face 144 and a second prismatic face 143. The incident light perpendicular to the first substrate 12 are totally reflected at the first prismatic face 144 and are not totally reflected at the second prismatic face 143.

One of the first electrode 11 and the second electrode 21 is a common electrode, while the other one comprises a plurality of pixel electrodes. Each of the pixel electrodes, for example, corresponds to a pixel region. The plurality of pixel regions for example are defined by a plurality of gate lines and a plurality of data lines intersecting each other, and for example are arranged in an array. Each of the pixel regions for example comprises a thin film transistor as a switching element, while the pixel electrode is connected to one of the source electrode and drain electrode of the thin film transistor. Corresponding to this, the one of the first substrate 12 and the second substrate 22, which comprises pixel electrodes, can be formed as an array substrate, having thereon an array structure for driving the liquid crystal, and the other one for example can be formed as a color filter substrate, having thereon color filters and etc.

In the blue-phase liquid crystal panel provided in the present embodiment, different voltages are applied to the first electrode 11 disposed on the first substrate 12 and the second electrode 21 disposed on the second substrate 22, and an electric field is generated between the first electrode 11 and the second electrode 21 due to their different potential. Since the first electrode 11 is located on the first substrate 12, the second electrode 21 is located on the second substrate 22, and the first substrate 12 is disposed opposite to the second substrate 22, the direction of the generated electric field is perpendicular to the first substrate 12 and the second substrate 22, i.e., a vertical electric field is formed. In order to facilitate the description, it is assumed that the second electrode 21 is applied with a higher potential, while the first electrode 11 is applied with a lower potential, then the vertical electric field is directed from the second electrode 21 to the first electrode 11. Since the first electrode 11 and the second electrode 21 are disposed respectively on the first substrate 12 and the second substrate 22, the electric field is directed from the second electrode 21 to the first electrode 11, the vertical electric field penetrating the blue-phase liquid crystal layer 10 has good electric field strength and uniformity, and the arranging direction of the optical axes of the blue-phase liquid crystal molecules of the blue-phase liquid crystal layer 10 under the action of the vertical electric field is the same as the electric field direction.

As shown in FIG. 3, the direct front light 151 emitted out from the backlight module 15 are in the direction perpendicular to the liquid crystal panel. Among the direct front light 151, one part of the light emitted to the first prismatic face 144 of the first microprism 141 is totally reflected, then emitted to the second prismatic face 143 of the first microprism 141, refracted by the second prismatic face 143, and at last guided into the liquid crystal panel. The other part of the direct front light 151 is irradiated directly on the second prismatic face 143, refracted by the second prismatic face 143, and at last guided into the liquid crystal panel. After being refracted by the second prismatic face 143 of the first microprism 141, the two parts of light form slant front light 152 having a predetermined angle with respect to the direction of the electric field. The slant front light 152 enters the blue-phase liquid crystal layer 10 after being polarized by the first polarizer 13, and the blue-phase liquid crystal molecule in the blue-phase liquid layer 10 can change the phase retard of the slant front light 152.

The vertical electric field of the aforesaid blue-phase liquid crystal panel is formed by the first electrode 11 and the second electrode 21. The first electrode 11 is provided on the first substrate 12, and the second electrode 21 is provided on the second substrate 22 that is disposed opposite to the first substrate 12. After being energized, the first electrode 11 and the second electrode 21 together generate an electric field being directed from the electrode at a higher potential to the electrode at a lower potential. Since the direction of the electric field is perpendicular to the blue-phase liquid crystal layer 10, the electric field strength of the entire liquid crystal cell area is effectively increased. In addition, the perpendicular electric field has a good uniformity, which allows the blue-phase liquid crystal molecules in each pixel region of the blue-phase liquid crystal display device to response and to be stretched and aligned in a direction perpendicular to the first substrate 12 and the second substrate 22. At the same time, the first substrate coupling film 14 changes the light angle of the direct front light 151 of the backlight module entering the liquid crystal cell via the first microprism 141, and the blue-phase liquid crystal molecule in the blue-phase liquid crystal layer 10 gives rise to the phase retard of the incident slant front light 152, which lowers the operating voltage of the blue-phase liquid crystal.

Therefore, the blue-phase liquid crystal panel provided in the embodiment of the present invention has a lower operating voltage.

The first substrate and the second substrate mentioned in the above technical solutions may be glass substrates, or may be transparent substrates formed of polystyrene or other transparent materials. Detailed description is omitted here.

According to the properties of the blue-phase liquid crystal molecule, the angle between the slant front light 152 and the optical axis of the blue-phase liquid crystal molecule needs to be controlled in order to enhance the phase retard of the incident slant front light 152 caused by the blue-phase liquid crystal molecule. The control of the incident direction of the slant front light 152 can be realized by defining the arrangement of the first prismatic face 144 and the second prismatic face 143 of the first microprism 141. For example, as shown in FIG. 3, the first prismatic face 144 and the second prismatic face 143 of the first microprism 141 are perpendicular to each other, and angle $\beta$ between the first prismatic face 144 and the first substrate 12 is 75°~65°. The angle $\alpha$ between the second prismatic face 143 and the first substrate 12 is 15°~25°.

For example, angle $\beta$ between the first prismatic face 144 and the first substrate 12 is 70°.

Figure 4:
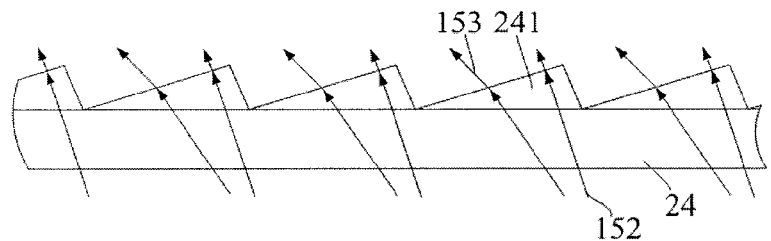
FIG. 4 is a schematic view showing the structure and the light-guiding principle of the second substrate coupling film in the blue-phase liquid crystal panel provided in the present invention.

As shown in FIG. 2 and FIG. 4, on the basis of the above embodiment, the blue-phase liquid crystal panel may further comprise a second substrate coupling film 24; the second polarizer 23 is located between the second substrate 22 and the second substrate coupling film 24, and a plurality of second microprisms 241 is disposed on the second substrate coupling film 24.

The coupling principle of the first substrate coupling film 14 is shown in FIG. 3. In the first substrate coupling film 14, the light rays of the direct front light 151 emitted out from the backlight module 15 that are irradiated on the second prismatic face 143 are refracted by the second prismatic face 143 and converted into the slant front light 152 to be guided into the liquid crystal panel, and then enter the blue-phase liquid crystal layer 10 of the liquid crystal panel after being polarized by the first polarizer 13. The light rays of the direct front light 151 that are irradiated on the first prismatic face 144 are totally reflected. The totally reflected light rays are emitted to the second prismatic face 143, then converted into the slant front light 152 after being refracted by the second prismatic face 143, and enter the blue-phase liquid crystal layer 10 after being polarized by the first polarizer 13. The slant front light 152 subjected to the phase retard by the blue-phase liquid crystal layer 10 penetrate through the second polarizer 23 disposed on an outer side face of the second substrate 22, and are guided by the second microprism 241 disposed on the second substrate coupling film 24. The second substrate coupling film 24 is used for prevent the slant front light 152 passing the second polarizer 23 from being subjected to total reflection.

Furthermore, as shown in FIG. 2, in order to improve the display effect, the blue-phase liquid crystal panel may further comprise a deflecting film 25 that is located on a side of the second substrate coupling film 24 away from the second polarizer 23. The function of the deflecting film 25 is to guide the slant front light 153 passing the second substrate coupling film 24 out of the display device, and to convert the slant front light 153 into directional light 154 adapted for viewers from different angles, thus to increase viewing angles. The specific principle and effect are shown in FIG. 5.

For example, the deflecting film 25 realizes the deflection of the slant front light 153 by means of the diffusion protrusions 251 provided on the side thereof adjacent to the second substrate coupling film 24.

For example, each of the diffusion protrusions 251 of the deflecting film 25 has a profile in a triangle shape, i.e., the diffusion protrusions 251 have a prismatic structure. The diffusion protrusion 251 having a prismatic structure may can the slant front light 153 into directional light 154 parallel to the front viewing angle of viewers.

Figure 5:
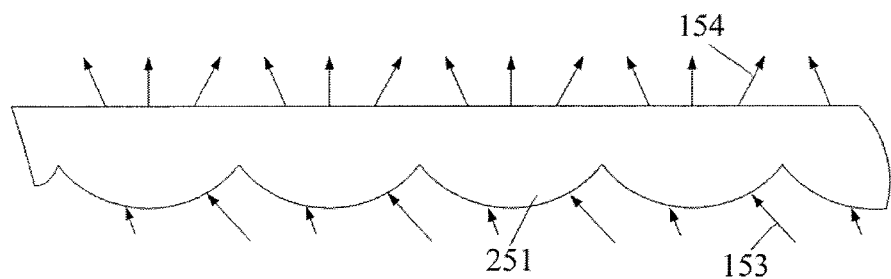
FIG. 5 is a schematic view showing the structure and the light-deflecting principle of the deflecting film in the blue-phase liquid crystal panel provided in the present invention.

Or, each of the diffusion protrusions 251 has a profile in a circular arc shape in order to enlarge the viewing angles of the blue-phase liquid crystal panel, as shown in FIG. 5.

Figure 1:
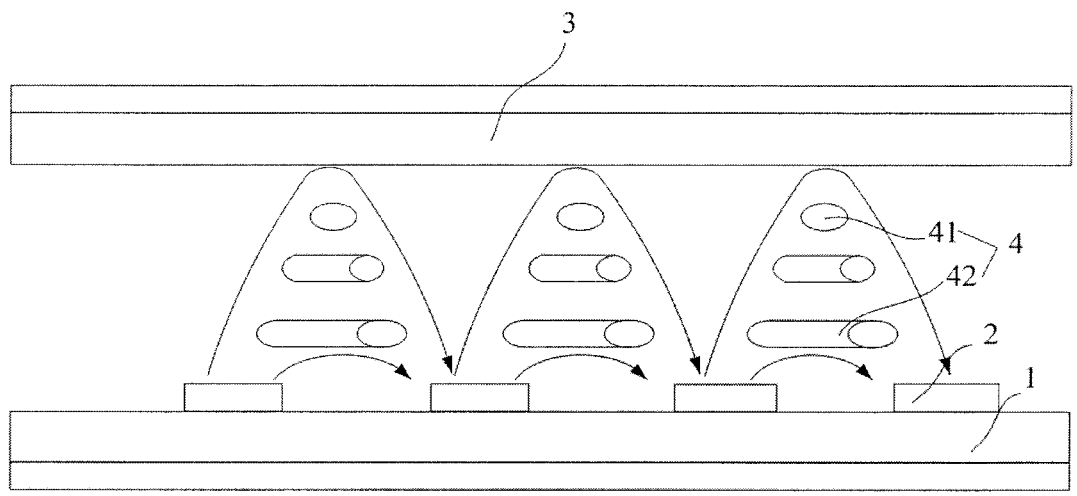
FIG. 1 is a structural schematic view of the blue-phase liquid crystal panel in the conventional technology.

For example, in order to better match the second substrate coupling film 24 with the slant front light 152 coupled by the first substrate coupling film 14, the first substrate coupling film 14 and the second substrate coupling film 24 may meet the same specifications, and the first microprisms 141 and the second microprisms 241 are reversely disposed opposite to each other. Firstly, the first substrate coupling film 14 and the second substrate coupling film 24 meet the same specifications and are reversely disposed opposite to each other, as shown in FIG. 1, FIG. 3 and FIG. 4. The second substrate coupling film 24 may further refract the slant front light 152 that has been subjected to phase retard, enlarge the range of out-going angles of the light, increase the viewing angles of the blue-phase liquid crystal panel, and at the same time facilitate production and assembling.

In a cross section of two adjacent first microprisms 141 on the first substrate coupling film 14, the length contacting the first substrate 12 may be smaller than the width of each of the sub-pixel unit in the liquid crystal panel.

As shown in FIG. 6, on the basis of the above technical solutions, another embodiment of the present invention further provides a blue-phase liquid crystal display device, comprising a backlight module 15 and a blue-phase liquid crystal panel according to any one of the aforementioned technical solutions. The blue-phase liquid crystal display device may also achieve the technical effect of the aforesaid blue-phase liquid crystal panel, and no more details about its principle are given here.

There are various solutions of display colors in the blue-phase liquid crystal display device. For example, the backlight module 15 is provided with white light emitting diodes (LEDs) or cold cathode fluorescent lamps (CCFLs) as a white light source, while the second substrate 22 of the blue-phase liquid crystal panel is provided with color filter. Of course, the backlight module 15 may adopt color LEDs as a colored light source directly, without the need of the color filter on the second substrate, which can simplify the structure of the blue-phase liquid crystal display device. The backlight module 15 may be, for example, direct-lighting type or edge-lighting type.

It should be understood that the first substrate mentioned in the aforesaid technical solutions may form a TFT array structure well known for those skilled in the art so as to form an array substrate.

The above embodiments of the present invention are given by way of illustration only and thus are not limitative of the protection scope of the present invention, which is determined by the attached claims.

The invention claimed is:

1. A blue-phase liquid crystal panel, comprising:
   a first substrate;
   a second substrate;
   a blue-phase liquid crystal layer between the first substrate and the second substrate, the first substrate being disposed opposite to the second substrate;
   a first electrode located on one surface of the first substrate facing the blue-phase liquid crystal layer;
   a first polarizer and a first substrate coupling film located on another surface of the first substrate, the first polarizer being located between the first substrate and the first substrate coupling film;
   a second electrode located on one surface of the second substrate facing the blue-phase liquid crystal layer;
   a second polarizer located on another surface of the second substrate, the first electrode and the second electrode being used for forming a vertical electric field;
   a second substrate coupling film, the second polarizer being located between the second substrate and the second substrate coupling film, and a plurality of second microprisms being disposed on the second substrate coupling film,
   wherein a plurality of first microprisms are formed on the first substrate coupling film, a cross section of a first microprism having a profile in a triangle shape, the first microprism having a first prismatic face and a second prismatic face, and incident light perpendicular to the first substrate is totally reflected at the first prismatic face and is not totally reflected at the second prismatic face; and
   one of the first electrode and the second electrode is a common electrode, while the other one comprises a plurality of pixel electrodes, and the first substrate coupling film and the second substrate coupling film meet same specifications, and the first microprisms and the second microprisms are reversely disposed.

2. The blue-phase liquid crystal panel according to claim 1, wherein the first prismatic face and the second prismatic face of the first microprism are perpendicular to each other, and an angle between the first prismatic face and the first substrate is 75°~65°.

3. The blue-phase liquid crystal panel according to claim 2, wherein the angle between the first prismatic face and the first substrate is 70°.

4. The blue-phase liquid crystal panel according to claim 1, further comprising a deflecting film that is located on a side of the second substrate coupling film away from the second polarizer.

5. The blue-phase liquid crystal panel according to claim 4, wherein the deflecting film is provided with a plurality of diffusion protrusions on a side facing the second substrate coupling film.

6. The blue-phase liquid crystal panel according to claim 5, wherein each of the diffusion protrusions has a profile in a triangle shape.

7. The blue-phase liquid crystal panel according to claim 5, wherein each of the diffusion protrusions has a profile in a circular arc shape.

8. A blue-phase liquid crystal display device, comprising a backlight module and a blue-phase liquid crystal panel according claim 1.

9. The blue-phase liquid crystal display device according to claim 8, wherein the backlight module is provided with a white light source, and the second substrate of the blue-phase liquid crystal panel is provided with color filter.

10. The blue-phase liquid crystal display device according to claim 8, wherein the backlight module is provided with a colored light source.

* * * * *